A. N. MERRILL.
Agricultural Boiler.
No. 98,988. Patented Jan. 18. 1870.
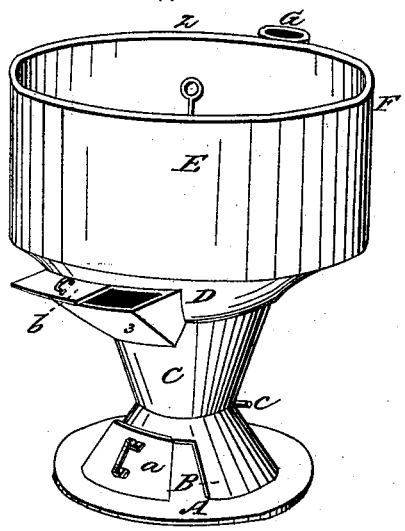
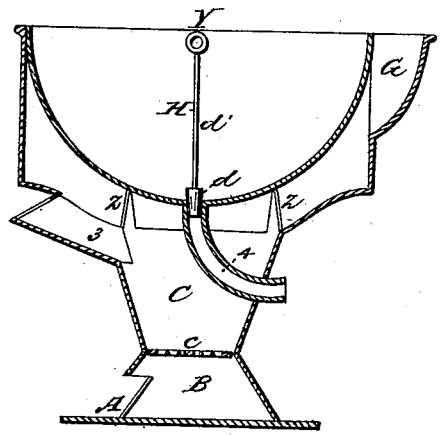
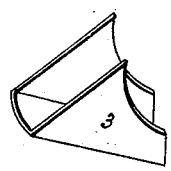
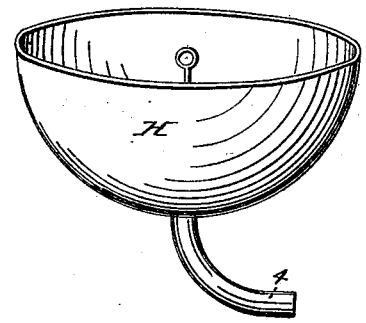
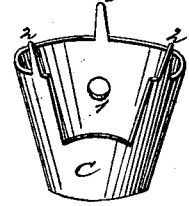
WITNESSES:
INVENTOR:

United States Patent Office.

ALLEN N. MERRILL, OF BATAVIA, ILLINOIS.

Letters Patent No. 98,988, dated January 18, 1870.

FARMERS' BOILER.

The Schedule referred to in these Letters Patent and making part of the same.

*To all whom it may concern:*

Be it known that I, ALLEN N. MERRILL, of Batavia, in the county of Kane, and State of Illinois, have invented a new and improved Farmers' Boiler; and I do hereby declare that the following is a full, clear, and exact description of the same, reference being had to the accompanying drawings, making a part of this specification, in which—

Figure 1 is a perspective view;
Figure 2 is a transverse vertical section;
Figure 3 is a perspective view of the boiler;
Figure 4 is a perspective view of the fire-pot; and
Figure 5 is a perspective view of the feed-spout.

This invention consists of various improvements in boilers for farmers' use, in the preparation of feed for stock, all tending to increase the efficiency of the apparatus.

A is a metal bottom-plate;
B, a conical holder resting on the bottom-plate;
C, a fire-pot resting on the conical holder;
D, an inverted cone, resting on the fire-pot;
E, a wrought-iron jacket, resting on the cone; and
H, the semispherical boiler enclosed within the jacket E, and supported on legs, 2, projecting upward from the top of the fire-pot.

The latter is provided with a fuel-feed spout, 3, having a cover, $b$.

The base B has a draught-orifice fitted with a door, $a$.

The boiler is furnished with a curved spout, 4, opening out of its bottom, for the discharge of the contents of the kettle.

A stopper, $d$, having a handle, $d'$, closes the upper end of the spout 4.

G is a pipe for letting off the products of combustion from the space enclosing the fire-pot.

The grate is shown at $c$.

Having thus described my invention,

What I claim as new, and desire to secure by Letters Patent, is—

The boiler H, provided with the spout 4, in combination with the jacket E, cone D, fire-pot C, and base B, constructed and operating substantially as described.

ALLEN N. MERRILL.

Witnesses:
HENRY S. FIELD,
J. O. McCLELLAN.